H. C. OGLE.
ELECTRIC MOTOR.
APPLICATION FILED FEB. 20, 1912.

1,057,394.

Patented Mar. 25, 1913.

3 SHEETS—SHEET 1.

Witnesses
William R. Smith
John J. McCarthy

Inventor
Harley C. Ogle.
By Victor J. Evans
Attorney

H. C. OGLE.
ELECTRIC MOTOR.
APPLICATION FILED FEB. 20, 1912.

1,057,394.

Patented Mar. 25, 1913.

3 SHEETS—SHEET 2.

Witnesses
William A. Smith.
John J. McCarthy

Inventor
Harley C. Ogle.

By Victor J. Evans
Attorney

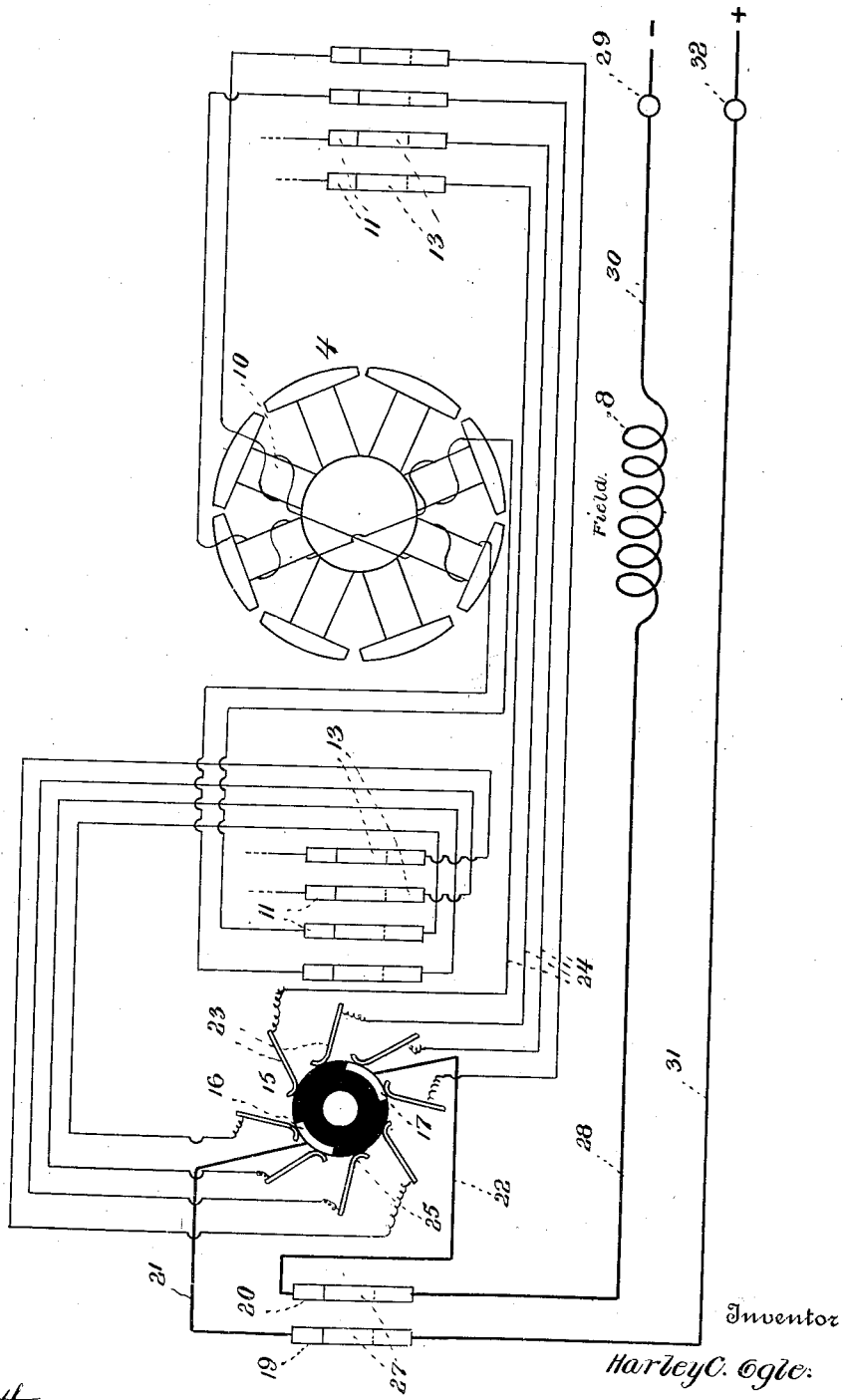

UNITED STATES PATENT OFFICE.

HARLEY C. OGLE, OF DEXTER CITY, OHIO, ASSIGNOR OF ONE-HALF TO LAWRENCE STEVENS, OF MARIETTA, OHIO.

ELECTRIC MOTOR.

1,057,394.

Specification of Letters Patent. Patented Mar. 25, 1913.

Application filed February 20, 1912. Serial No. 678,830.

*To all whom it may concern:*

Be it known that I, HARLEY C. OGLE, a citizen of the United States of America, residing at Dexter City, in the county of Noble and State of Ohio, have invented new and useful Improvements in Electric Motors, of which the following is a specification.

This invention relates to improvements in electric motors and has particular application to draft motors.

In carrying out the present invention, it is my purpose to provide an electric motor of this type wherein the movement of the rotor may be timed and controlled so that the same may be operated at the desired speed in order to facilitate the operation of the motor in the utilization of the same for draft purposes, such as hauling, hoisting and the like.

Furthermore, I aim to provide a motor of this character wherein by means of a controller, the electric current may be commutated and directed through the armature or rotor to facilitate the rotation and regulate the speed of the same to various loads.

The invention also involves the provision of a controller whereby the direction of rotation of the rotor may be reversed when such is desired, the controller being operable independently of the rotor but movable therewith whereby the rotor may be revolved in the rotation of the controller and operated indirectly from the controller through the medium of an electric current.

With the above objects in view and others of a similar nature, the invention consists in the construction, combination and arrangement of parts hereinafter set forth in and falling within the scope of the appended claims.

Figure 1:
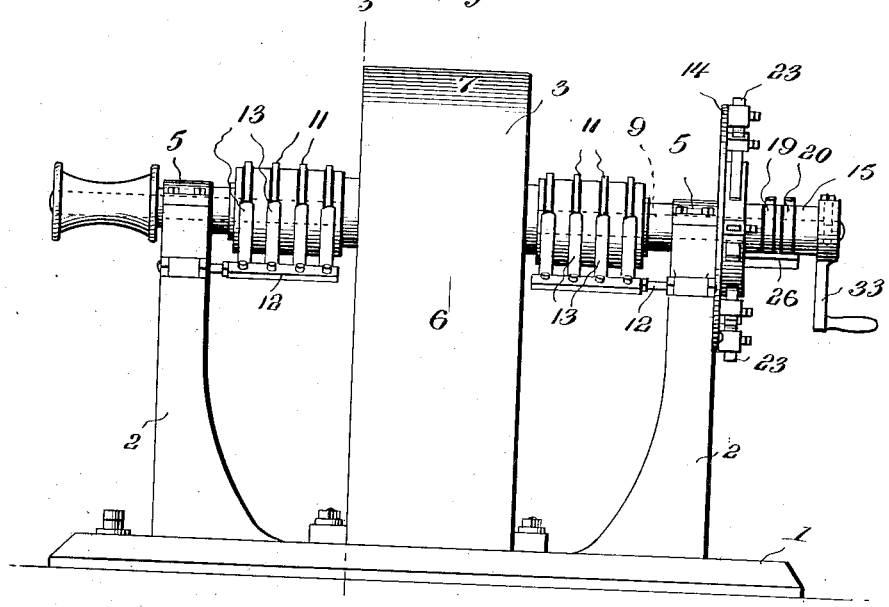
Figure 2:
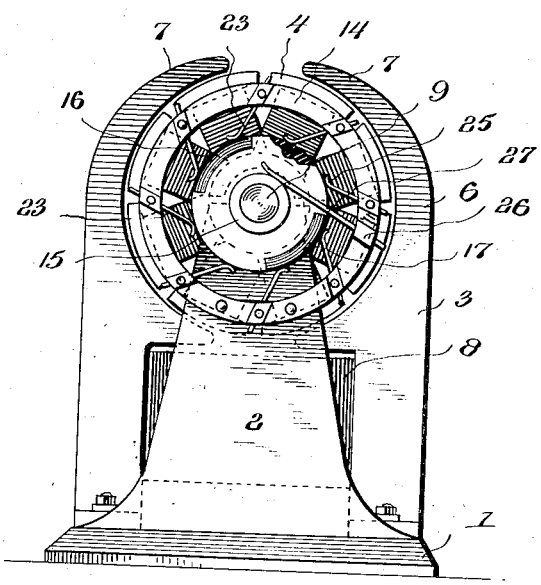
Figure 3:
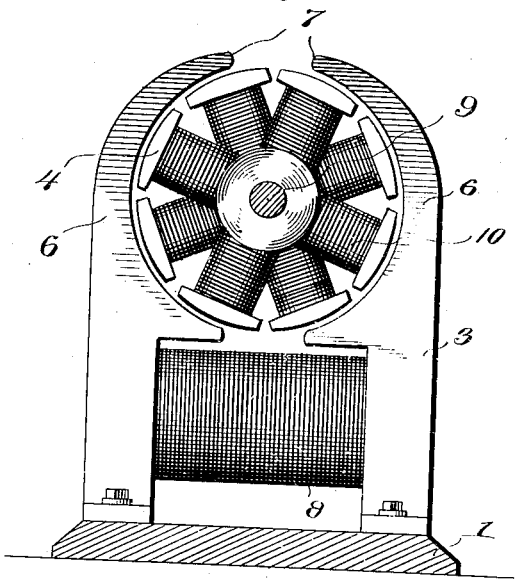
Figure 4:
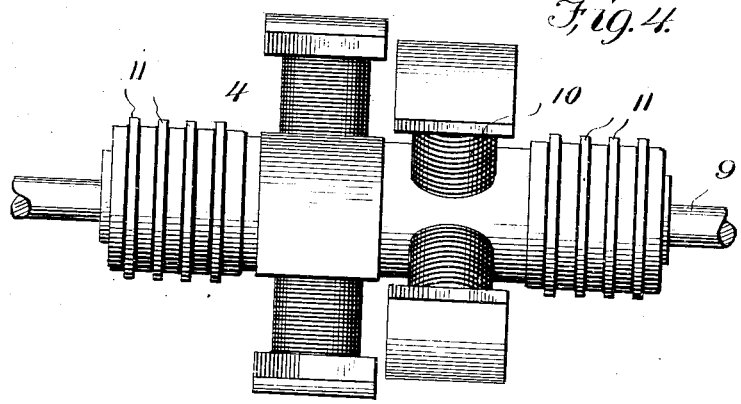
Figure 5:
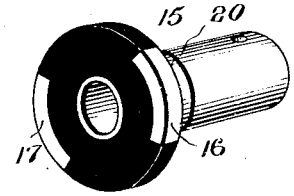

In the accompanying drawings; Figure 1 is a side elevation of an electric motor constructed in accordance with the present invention. Fig. 2 is an end elevation of the same. Fig. 3 is a section on the line 3—3 of Fig. 1. Fig. 4 is a detail perspective view of the armature or rotor. Fig. 5 is a similar view of the controller, and Fig. 6 is a diagrammatic view of the circuit through the motor.

Similar reference characters designate like parts throughout the several views.

In the accompanying drawings I have shown the invention applied to an electric motor of the direct current type. Certain features of the invention, however, are applicable to electric motors either of the direct or the alternate current type and several other types of motors such as that class of motors known as induction, etc., and it will be understood that the invention is therefore not limited to the specific form of motor as embodied in the drawings, as I contemplate certain modifications and changes which may be made in order to adapt the invention to the best advantage according to the circumstances and requirements in each particular case.

Referring to the accompanying drawings in detail, the motor in the present instance is mounted upon a base 1 provided with the upright spaced parallel standards 2 between which latter is mounted the stator 3 which is bolted or otherwise securely fastened to the base 1. The armature or rotor is indicated at 4 and in this instance is journaled in suitable bearings 5 carried by the upper ends of the standards 2 at opposite sides of the stator.

The stator in the present embodiment of the invention embodies the field magnets 6 terminating in oppositely disposed segmental pole pieces 7 between which revolves the armature or rotor 4, the pole pieces of the field magnets being energized from a core receiving its energization from a wrapping or winding 8.

The armature, in the present showing, embodies a shaft 9 journaled in the bearings 5 and carrying the magnets 10 revoluble within the field and arranged in a plurality of rows about the armature shaft, the magnets of one row being staggered with respect to those of the adjacent row, two of such rows being shown as an example and each comprising four poles or two magnets, the poles of each magnet being wound in relatively opposite directions to present alternate north and south poles to the pole pieces of the field magnets in order to facilitate the rotation of the armature as will be readily understood.

Fixed upon the armature shaft 10 at opposite sides of the armature magnet are sets of current conveying rings 11 insulated from one another and from the shaft 9. Each set of the current conveying rings, in the present instance, is composed of four rings, incident to the armature embodying but four magnets, one ring of each set being connected to the opposite terminals of the winding of each magnet so that a circuit may be completed through each magnet of the armature in the movement of the controller which will be hereinafter more fully described.

Suitably secured to the standards 2 at appropriate distances from the current conveying rings 11 are brackets 12 and fixed to each bracket is a set of brushes 13, the number of brushes in each set corresponding to the number of rings in the respective set of the current conveying rings carried by the armature shaft. These brushes 13 are designed to bear upon the rings of their respective sets and are insulated from one another and act to supply current to the windings of the armature magnets and take such current therefrom in order to make a circuit through the armature to facilitate the rotation thereof within the field.

In order to supply the current to the rotor by way of one set of brushes 13 and take such current from the rotor, I have provided a controller or commutator by means of which the current may be reversed in its flow through the armature so that the armature may be rotated in either a backward or forward direction. This controller, in the present disclosure of the invention, includes a contact holder 14 in the form of an annulus and secured in any suitable or desired manner to the outer surface of one of the standards 2 and arranged concentrically about the shaft 9.

Loosely mounted upon the armature shaft 9 and secured thereto against longitudinal movement, is a movable current controller 15, embodying in the present instance a pair of diametrically disposed segments 16 and 17 insulated from each other and from the sleeve 18 of the current controller, which sleeve encircles the armature shaft. Fixed upon the sleeve and insulated therefrom and from each other are current carrying rings 19 and 20 connected to the segments 16 and 17 respectively through the medium of conductors 21 and 22, the rings 19 and 20 serving to convey the current to and from the motor armature. The insulated segments 16 and 17 of the current controller are arranged intermediate the armature shaft 9 and the annular contact holder 14 and are concentric with respect to such shaft.

Fixed within the contact holder 14 at appropriate intervals and extending within the same are a plurality of contacts 23, eight being shown in this instance and these contacts are connected to the brushes 13 by way of conductors 24, the connections being such as to facilitate the feeding of the current to the proper pole pieces of the armature magnets so that the same may be reversed with respect to the pole pieces of the field magnets to impart the proper movement to the armature as is understood. The contacts 23 as illustrated are arranged circumferentially of the segments of the current controller and are disposed at a tangent thereto and each has its engaging terminal upturned as at 25 to provide a bearing surface to receive one or the other of the segments of the current controller in the movement of the latter in either direction.

Fast upon the contact holder 14 is a bracket 26 and to this bracket is fastened a pair of brushes 27 having rubbing engagement with the rings 19 and 20 in order to convey current to the current controller and take such current therefrom. One of these brushes 27 as illustrated is connected by means of a conductor 28 to one terminal of the field winding 8, the opposite terminal of which latter is connected to a binding post 29 by way of a conductor 30, the other brush of the pair 27 being connected to a conductor 31 having its free terminal connected to a binding post 32, the binding posts 29 and 32 being designed to receive an electric current from the mains (not shown).

The field winding, as shown is connected in series with the controller and the armature windings are also connected in series with the controller. By virtue of these connections it will be seen that when the controller is rotated in one direction, the segments 16 and 17 will engage with alternate pairs of contacts 23 to supply current to the armature magnets within the maximum magnetic force of the field, the continuous rotation of the controller making the current through the magnets within such force of the field thereby producing a continuous movement of the armature within the field and subjecting the same to regulation and timing whereby the motor may be adapted to hauling or utilized for other draft purposes, it of course being understood that the speed of the armature is proportional to the speed of rotation of the controller.

A crank 33 is connected to the sleeve 18 of the current controller in any suitable manner and is designed for manual operation whereby movement may be imparted to the controller, it of course being understood that the crank 33 may be connected to any suitable mechanism at a point remote from the motor to facilitate the operation of the latter from a distant point. Upon the direction of the controller being reversed it will be seen that the flow of current through the armature is reversed thereby permitting a reverse movement of the armature in accordance with the movement of the controller.

While I have shown and described one embodiment of the invention, by way of illustration, I desire to have it understood that I do not limit myself to all of the details of construction herein shown and described, as modification and variation may be made within the scope of the claims without departing from the spirit or sacrificing any advantages of the invention.

I claim:

1. An electric motor comprising a stator, a rotor having windings, a plurality of current conveying rings associated with the rotor and connected to the windings thereof, a plurality of brushes contacting with said rings and adapted to supply current to the rotor and take such current therefrom, and a controller operable to control the flow of current to the windings of the rotor and time the rotation thereof, said controller comprising a sleeve loosely surrounding the armature shaft, segments carried by said sleeve at diametrically opposite points, current carrying rings upon said sleeve and in electrical communication with said segments, an annular contact holder surrounding said sleeve and spaced apart therefrom, and a plurality of contacts fixed to said holder and extending inwardly thereof and bearing upon said segments.

2. The combination with an electric motor including a stator and a rotor, of a controller for the motor operable to permit the passing of a current through the rotor in reverse directions and to vary the speed of said rotor, said controller comprising a sleeve surrounding the armature shaft, segments carried by said sleeve at diametrically opposite points, current carrying rings carried by the sleeve and each in electrical communication with one of said segments, an annular contact holder surrounding said sleeve and spaced apart therefrom, a plurality of contacts carried by said holder and extending inwardly thereof and bearings upon said segments, and means for rotating said sleeve.

In testimony whereof I affix my signature in presence of two witnesses.

HARLEY C. OGLE.

Witnesses:
H. E. KEYSER,
J. D. POLING.